Dec. 17, 1946.  W. M. SCHMIDT ET AL  2,412,912
COLLECTING ELECTRODE STRUCTURE
Filed Sept. 23, 1944  3 Sheets-Sheet 1

Inventors
Walter Malcolm Schmidt
Donald K. Townsend

Alfred W. Knight
Attorney

Dec. 17, 1946.  W. M. SCHMIDT ET AL  2,412,912
COLLECTING ELECTRODE STRUCTURE
Filed Sept. 23, 1944  3 Sheets-Sheet 2

Inventors
Walter Malcolm Schmidt
Donald K. Townsend
Alfred W. Knight
By
Attorney Dec. 17, 1946.        W. M. SCHMIDT ET AL        2,412,912
COLLECTING ELECTRODE STRUCTURE
Filed Sept. 23, 1944          3 Sheets-Sheet 3
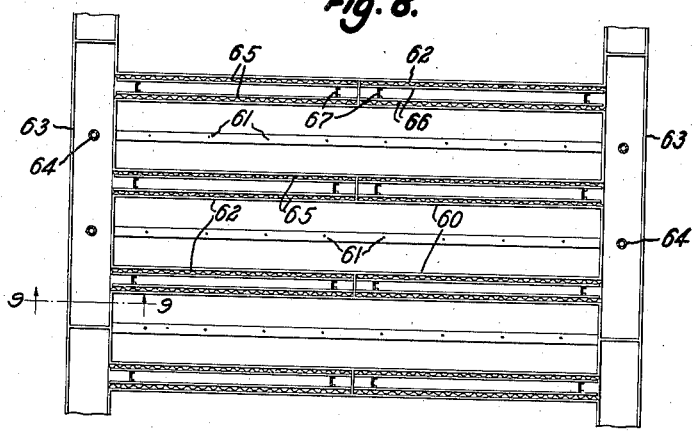
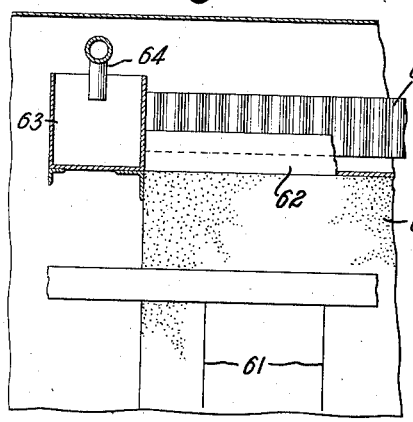
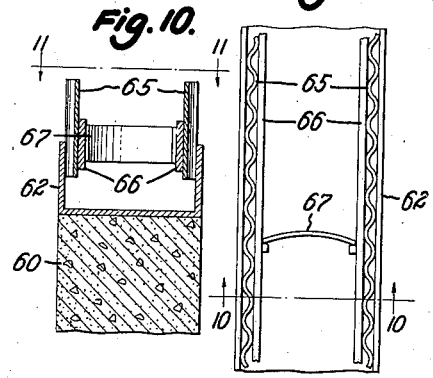
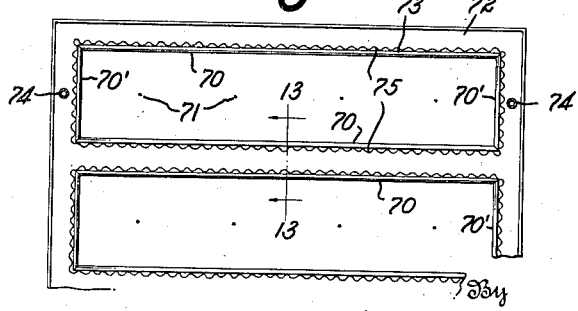
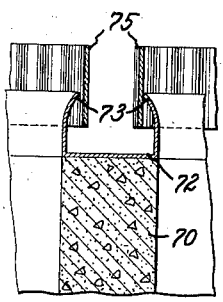
Inventors:
Walter Malcolm Schmidt
Donald K. Townsend
Alfred W. Knight
Attorneys.

Patented Dec. 17, 1946

2,412,912

UNITED STATES PATENT OFFICE 2,412,912

COLLECTING ELECTRODE STRUCTURE

Walter Malcolm Schmidt and Donald K. Townsend, Los Angeles, Calif., assignors to Western Precipitation Corporation, Los Angeles, Calif., a corporation of California Application September 23, 1944, Serial No. 555,490

5 Claims. (Cl. 183—7)

This invention relates to collecting electrodes of electrical precipitation apparatus for use in the separation of suspended material from gases, and particularly to collecting electrodes of the type in which a thin film of liquid is passed, preferably continuously, over the collecting electrode surfaces on which the material is precipitated.

Although the principles of the invention are applicable to any type of liquid-flushed collecting electrode, the advantages of the invention will be more particularly described in connection with liquid-flushed collecting electrodes comprising vertical pipes or tubes. Such collecting electrodes are ordinarily assembled within a housing and mounted adjacent their upper ends on a horizontally extending wall or header plate. The gas is passed vertically through the collecting electrode pipes, and an opposing precipitating electrode extends centrally within each pipe. Water or other suitable liquid is supplied to the space around the upper ends of the collecting electrodes above the header plate, and flows over the upper edges of these electrodes and down the inside surfaces thereof, on which the material is precipitated. The space above the header plate constitutes a liquid supply chamber or reservoir, and the upper ends of the collecting electrodes extend upwardly above the header plate and act as overflow lips or weirs to control the flow of water into each electrode.

An electrical precipitator of this general type is shown in United States patent of Crowder et al. No. 1,968,334, issued July 31, 1934. Such liquid-flushed pipe collecting electrodes are useful in precipitators of the single-stage type, as disclosed in the above-mentioned patent, in which the precipitating electrodes within the pipes are discharging electrodes such as small diameter wires, or rods provided with sharp edges or points, whereby a corona discharge is maintained for the purpose of both charging and precipitating suspended particles in the electric field between these electrodes and the collecting electrodes.

Similar liquid-flushed collecting electrodes are also useful in electrical precipitators of the two-stage type, in which the charging and precipitating of the suspended material are carried out in successive spatially separated fields. In this case the precipitating electrodes within the pipes may comprise non-discharging electrode members of extended surface, such as smooth rods or pipes of sufficient diameter to substantially avoid corona discharge; or the precipitating electrodes may comprise composite electrode elements provided with both discharging and non-discharging portions, as shown for example in United States patent of Anderson, No. 2,192,172, issued March 5, 1940.

Electrical precipitators of the types above described are well known in the art. The present invention is concerned only with an advantageous form of collecting electrode structure for use in any type of precipitator employing vertical liquid-flushed collecting electrodes, and it will be understood that such electrode structures may be used in connection with any type or form of opposing precipitating electrode.

In the treatment of large volumes of gas, it is customary to provide a considerable number of collecting electrode pipes in a single unit or section of the precipitator, and it is desirable to maintain a substantially uniform flow of liquid down the inner surfaces of all the pipes. Although the liquid reservoir above the header plate may be subdivided by partitions into a number of separate compartments, the arrangement is generally such that each such compartment surrounds and supplies liquid to a plurality of the electrodes. It is therefore advantageous to provide for adjusting the upper edges of the individual electrodes, over which the liquid flows. The means for this purpose should preferably be such as to provide not only for vertical adjustment of the overflow lip or weir at the upper end of each electrode in order to maintain substantially equal flow of liquid from the surrounding space into the several electrodes, but also for vertical angular adjustment of such overflow lip or weir in order to secure substantially uniform flow of liquid at different positions around the circumference of each electrode and thus insure substantially uniform flow of liquid over all portions of the collecting electrode surface.

The collecting electrode pipes are generally of substantially uniform diameter throughout the major portion of their height to provide the desired spacing of the collecting surface, and the liquid film thereon, from the opposing electrode. It is desirable that this portion of the collecting electrode surface be free from sharp edges or other irregularities or discontinuities that would tend to disturb the smooth flow of the liquid film or to cause electrical discharge from the collecting electrode. It is also desirable that the upper end portion of the collecting electrode including the overflow lip or weir at which the liquid film is formed, as well as the lower end portion of the collecting electrode where the liquid leaves the collecting surface, be of materially greater diameter than the major portion of the pipe, so as to prevent electric discharge from the ends of the collecting electrode and to provide for forming and breaking the liquid film at positions of reduced electric field strength.

It has been found, however, that in spite of the most careful vertical and angular adjustment of the upper end portions of the collecting electrodes in precipitators of the types described above, inequalities of flow between different collecting electrodes and at different points of the circumference of the individual electrodes are difficult to eliminate. Such inequalities of flow are particularly apt to arise after the precipitators are put into operation, due to slight variations in rate of supply of flushing liquid, arising, for example, from partial plugging of feed lines, or to small shifts due to settling.

We have now found that the adjustment of the level of the upper ends of the collecting electrodes can be rendered far less critical and substantial equality of flow to the individual collecting electrodes and about the circumference thereof can be maintained in spite of considerable variations in the supply of flushing liquid, shifts in level of the apparatus and other changing conditions of operation, by providing a substantial hydraulic head of flushing liquid adjacent the upper ends of the collecting electrodes, and particularly by providing a throttling curtain adjacent the weir lip at the upper ends of the collecting electrodes whereby a controlled flow of liquid to the weir lip is maintained under a substantial hydraulic head.

A principal object of this invention is to provide a collecting electrode structure which can be easily adjusted to provide equal flow of flushing liquid over the entire collecting surface of each of the collecting electrodes of a group.

A further object of the invention is the provision of a collecting electrode structure which will maintain an equal flow of liquid over the entire collecting surface of each of the collecting electrodes of a group in spite of substantial changes in liquid supply, level, or other operating conditions.

Another object of the invention is to provide a collecting electrode structure which will maintain a controlled constant rate of flow of liquid to the upper end of the collecting electrode under a substantial hydraulic head.

These and other objects and advantages which will be apparent from the further description of the invention are attained by the collecting electrode structure of the invention which broadly comprises a vertically-extending electrode member providing a collecting surface of extended area, the upper end portion of the electrode carrying a weir substantially coextensive with the upper end thereof, and a throttling curtain adjacent the weir, the throttling curtain extending a substantial distance above the weir and being spaced therefrom to provide a constricted passage to the weir from a body of liquid adjacent the throttling curtain. Preferably the throttling curtain is formed to provide a plurality of constricted passages substantially equally spaced along the weir.

The weir may be an integral part of the upper end of the collecting electrode or it may be adjustably carried thereby either as a separate member or as an element of the throttling curtain.

The invention will be more particularly described with reference to the accompanying drawings, in which:

Fig. 8 is a fragmentary diagrammatic plan view of the top of the collecting electrode structure of an electrical precipitator including vertical plate collecting electrodes embodying the principles of the invention;

Fig. 9 is a fragmentary vertical section of the upper portion of the collecting electrode structure of Fig. 8;

Fig. 10 is an enlarged fragmentary detail in vertical section, and Fig. 11 is an enlarged fragmentary detail in plan of the embodiment of Fig. 8;

Fig. 12 is a diagrammatic plan view of the top of the collecting electrode structure of an electrical precipitator including rectangular vertical gas treating ducts embodying the invention; and Fig. 13 is an enlarged fragmentary detail in vertical section on line 13—13 of Fig. 12.

Figure 1:
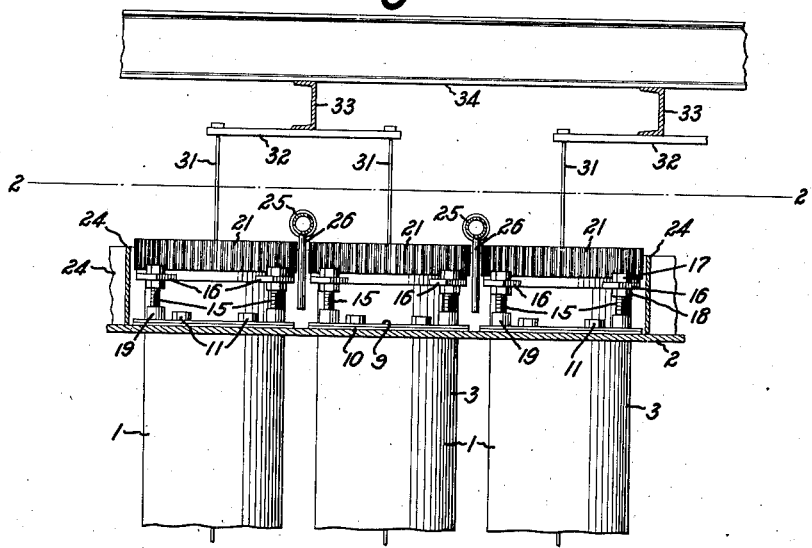
Fig. 1 is a partial vertical section of an electrical precipitator with several collecting electrodes embodying the principles of the invention and associated precipitating electrodes shown in elevation.
Figure 2:
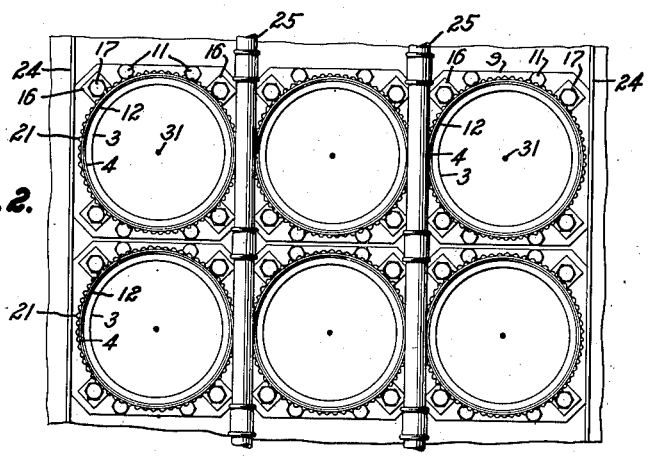
Fig. 2 is a horizontal section on line 2—2 of Fig. 1.

In Figs. 1 and 2, a plurality of tubular collecting electrodes 1 are shown as extending vertically through and supported upon a header plate 2, it being understood that these electrodes are ordinarily mounted within an enclosed precipitator housing provided with gas inlet and gas outlet means at opposite sides of the header plate so as to provide for passage of gas to be treated vertically through the several electrodes, as is more fully shown and described in the above-mentioned United States Patent No. 1,968,334.

Figure 3:
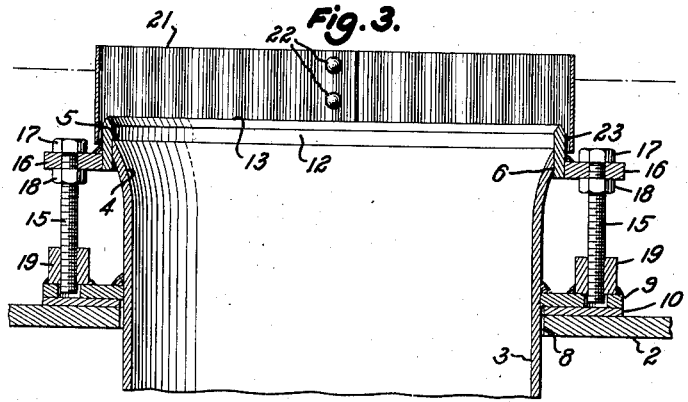
Fig. 3 is an enlarged vertical section of the upper end of one of the collecting electrode structures of Fig. 1.
Figure 3A:
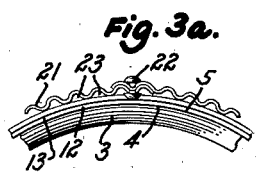
Fig. 3a is a fragmentary detail of the collecting electrode structure of Fig. 3.

Each collecting electrode comprises a pipe 3 of suitable length and diameter, which is of substantially uniform diameter throughout the major portion of its length. The upper end of the pipe extends above the header plate 2, and is flared outwardly as shown at 4 to provide an upper edge 5 of materially greater inside diameter than the major portion of the pipe. At the upper edge the external surface of the pipe is preferably finished so as to provide a short cylindrical bearing surface 6, as shown more particularly in Fig. 3.

Each of the collecting electrode pipes extends through an opening 8 in header plate 2 and is shown as supported on said header plate by means of an outwardly projecting annular flange 9 welded or otherwise secured to the pipe and supported on the header plate. A suitable gasket 10 is preferably provided between flange 9 and header plate 2 and the flange is shown as secured to the header plate by means of bolts 11, thus providing a fluid-tight connection between the header plate and each pipe.

An adjustable weir ring 12 is mounted in position around the upper end of each pipe 3, with its cylindrical inner surface in close sliding engagement with cylindrical face 6 on the pipe. Ring 12 extends upward above the upper edge 5 of the pipe and is provided with a plane upper edge 13. Means are provided for supporting and adjusting the weir ring, comprising for example four adjusting screws or bolts 15, extending through outwardly projecting members such as lugs 16 at equally spaced positions around the ring and provided with heads 17 and nuts 18 bearing against the upper and lower faces, respectively, of said lugs. The lower ends of adjusting screws 15 engage nuts or other internally threaded members 19 welded or otherwise secured to flange 9. Thus, by suitable manipulation of screws 15 and nuts 18 the weir ring 12 may be raised or lowered at the position of each adjusting screw, so as to provide vertical adjustment of the weir ring relative to pipe 3 and also for vertical angular adjustment of said ring relative to said pipe. Although the ring fits quite closely about the external face 6 at the upper end of the pipe in order to provide a substantially liquid-tight engagement, the relationship is such as to permit some angular tilting of the ring relative to the pipe. It will be observed that the vertical dimension of face 6 is quite short relative to the diameter thereof so as not to unduly limit such tilting movement, and the fit at this point need not be extremely close in order to substantially prevent leakage of liquid between the pipe and the ring.

Surrounding the upper ends of the weir rings 12 are corrugated throttling rings 21 which may be formed by fastening a suitable strip of corrugated metal or other suitable material by rivets 22 to provide a sliding fit over the outside of weir ring 12. The corrugated throttling rings in association with the weir ring thus provide a plurality of constricted passages 23 from the space outside the throttling rings to the overflow edge of the weir. The depth of the corrugations may advantageously be of the order of $\frac{1}{16}$ inch.

The space above the header plate 2 serves as a liquid reservoir, and this space may be divided into a plurality of separate liquid supply compartments or troughs, as by means of suitably spaced walls 24 extending upwardly from header plate 2 to a level substantially above the upper edges or overflow lips 13 of the weir rings 12. A plurality of collecting electrodes are arranged with their upper ends within each of the liquid supply compartments or troughs thus provided between adjacent walls 24. Liquid for flushing, such as water, oil, or any other suitable liquid, is supplied through pipes 25 and downwardly-extending nipples 26 which deliver the liquid above the header plate and below the weir rings, as indicated in Fig. 1.

The precipitating electrodes are shown as comprising discharge electrode members 31, such as wires or square twisted rods, extending axially through the collecting electrodes and supported at their upper ends by suitable supporting frame means such as are indicated at 32, 33 and 34 in Fig. 1.

The collecting electrodes are ordinarily maintained at ground potential, while the entire discharge electrode system including discharge electrodes 31 and the associated supporting and spacing means is mounted on insulating supports, so that the necessary high potential may be maintained between the discharge and collecting electrodes to cause corona discharge from discharge electrodes 31.

After the apparatus is erected, but preferably before the throttling rings 21 are installed, a suitable liquid is supplied to each of the compartments defined by walls 24, and the weir rings 12 of the several collecting electrodes in each of such compartments are adjusted as described above to provide substantially equal flow of liquid into the respective electrodes and substantially equal flow of liquid at all circumferential positions around the upper edge of each of the weir rings.

Thereafter the throttling rings 21 are put in place and the liquid level is raised above the level of the weir lip to provide a substantial hydraulic head at the level of the weir lip. This head, together with the throttling action of constricted flow passages 23, results in the damping out of the effects of fluctuations of level in the liquid supply compartments and eliminates or greatly reduces the effect of small changes in level of the apparatus, thereby maintaining a substantially uniform downward flow of liquid through all the electrodes in a thin film distributed substantially uniformly over the entire inner surface of each electrode.

The liquid film is formed at the upper edge of the weir ring at a position spaced from the opposing precipitating electrode 31 by a distance materially greater than the spacing between the precipitating electrode and the major portion of the inner surface of the collecting electrode, so as to avoid electrical disturbances. The entire surface over which the liquid flows between the top and bottom edges of each collecting electrode is preferably free from sharp edges or surface discontinuities or irregularities that might tend to disturb the smooth flow of the liquid or to cause electrical disturbances.

Although the precipitating electrodes are in this case shown as discharge electrodes, it will be understood that the collecting electrode structure of this invention may also be employed with non-discharging precipitating electrodes as brought out hereinabove.

Figure 4:
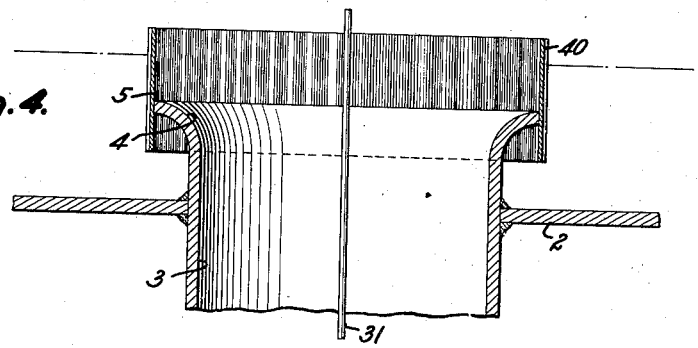
Fig. 4 is a vertical section of the upper end of a modified embodiment of the collecting electrode structure of the invention.
Figure 5:
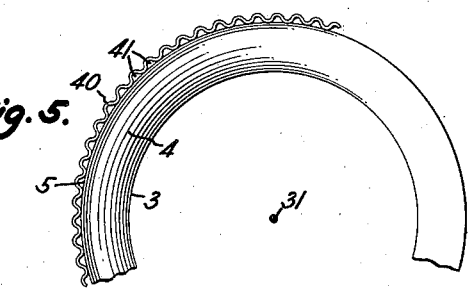
Fig. 5 is a partial plan view of the collecting electrode structure of Fig. 4.

In the embodiment of the invention shown in Figs. 4 and 5, the weir is provided by the upper edge 5 of the flared upper portion 4 of pipe 3. The flow of liquid to the weir lip is throttled by means of the constricted passages 41 provided by throttling member 40 which is a slightly conical ring formed of corrugated metal or other suitable material, held in position by engagement with the outer edge of the upper portion 4 of the pipe 3. The upper edge of the pipe may be adjusted to a suitable degree of planeness and levelness before the throttling member is placed in position, the adjustment, however, not being critical or sensitive to subsequent changes of level of the apparatus.

Figure 6:
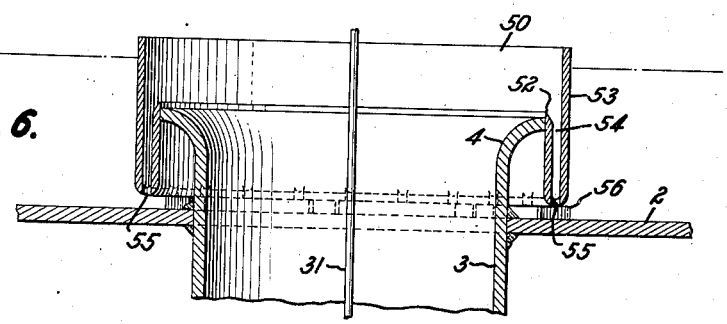
Fig. 6 is a vertical section of the upper end of a further embodiment of the collecting electrode structure of the invention.
Figure 7:
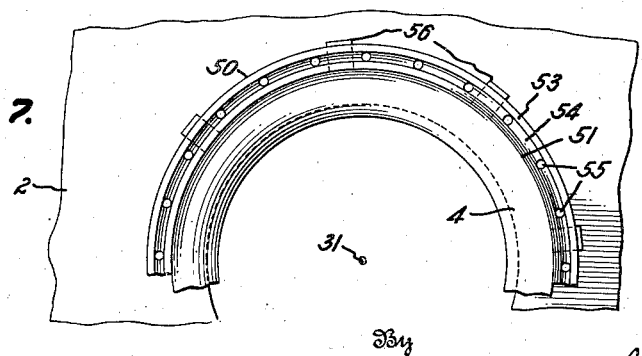
Fig. 7 is a partial plan view of the collecting electrode structure of Fig. 6.

In the form of the invention shown in Figs. 6 and 7, both the weir and the constricted passages are provided by the annular U-shaped member 50. The upper end 52 of the inner and shorter limb 51 of the U provides the weir lip, and the inner surface of the inner limb engages the outer edge of the upper flared portion 4 of the pipe 3 to substantially eliminate flow of liquid therebtween. The flow of liquid to the weir through the passage 54 between the outer, longer limb 53 of the U and the inner limb 51 is further throttled in passing through the inlet openings 55. The weir lip may be adjusted to and maintained in level position by means of suitable leveling blocks 56.

The level of the liquid in the liquid compartment is maintained at a substantial height above the level of the weir lips in the collecting electrode structure, varying in accordance with the rate of flow desired on the inner surfaces of the collecting electrodes and with the effective frictional resistance of the constricting passages. In general, a hydraulic head of from about ½ inch to about 4 inches will be found to be suitable.

In the precipitator illustrated in Figs. 8–11, the principles of the invention are applied to vertical plate collecting electrodes, consisting for example of concrete plates 60, spaced from complementary discharge electrodes 61. Along the tops of the plates 60 are horizontal troughs 62, communicating with end troughs 63 supplied with flushing liquid by pipes 64.

The weir lip along the top of the vertical collecting surfaces of plates 60 is formed by the upper edges of the side members of troughs 62. Corrugated strips 65, held in position against the sides of the troughs by stiff strip members 66 and leaf springs 67, shown more particularly in Figs. 10–11, provide a series of constricted liquid flow passages to the weir lips.

In the embodiment of the invention shown in Figs. 12–13, vertical wall members 70, 70' forming rectangular vertical gas passages form collecting electrode surfaces complementary to discharge electrodes 71. The upper edges of the horizontal troughs 72 forming liquid reservoirs at the top of the rectangular gas passages are bent away from the gas passages to provide weir edges 73 spaced apart a greater distance than the width of the passages to reduce the velocity of the gases at the level of the weirs. Liquid is supplied by pipes 74. Corrugated strips 75 are maintained in position at the back of the weir edges as shown in Figs. 10–11 or by other suitable means to provide constricted passages for liquid flow to the weirs.

It will be seen that the principles of the invention may be applied in a wide variety of forms which are characterized by the provision of a weir and means for constricting the flow of liquid to the weir as defined in the claims.

We claim:

1. A collecting electrode for use in liquid-flushed electrical precipitators comprising a vertically-extending electrode member providing a collecting surface of extended area, means providing a weir at the upper end of said electrode member and extending along the upper end of said collecting surface, means providing a liquid reservoir adjacent said weir and a corrugated curtain member extending from substantially below to substantially above the level of the weir and contacting the weir means to provide constricted passages for the flow of liquid from the reservoir to the weir.

2. A collecting electrode for use in liquid-flushed electrical precipitators comprising a vertically-extending pipe, means providing a circumferential weir at the upper end of the pipe, and a vertically corrugated cylindrical member circumferentially contacting the weir means to provide a plurality of constricted passages for the flow of liquid to the weir.

3. A collecting electrode for use in liquid-flushed electrical precipitators comprising a vertically-extending pipe having its upper end portion flared to provide an upper edge of materially greater inside diameter than the major portion of the pipe, means providing a circumferential weir at said upper edge of the pipe, and a vertically corrugated cylindrical member circumferentially contacting the weir means to provide a plurality of constricted passages for the flow of liquid to the weir.

4. A collecting electrode for use in liquid-flushed electrical precipitators comprising a vertically extending pipe, means providing a circumferential weir at the upper end of the pipe, means providing a reservoir for liquid adjacent the upper end of the pipe, and means providing a plurality of constricted passages substantially equally spaced along the weir for the flow of liquid from the reservoir to the weir.

5. A collecting electrode for use in liquid-flushed electrical precipitators comprising a vertically extending electrode member providing a collecting surface of extended area, means providing a weir at the upper end of said electrode member and extending along the upper end of said collecting surface, means providing a liquid reservoir adjacent said weir, and means providing a plurality of constricted passages substantially equally spaced along the weir for the flow of liquid from the reservoir to the weir.

WALTER MALCOLM SCHMIDT.
DONALD K. TOWNSEND.